Jan. 30, 1945.    G. G. MIZE    2,368,372
CHAIN BELT
Filed Aug. 8, 1942
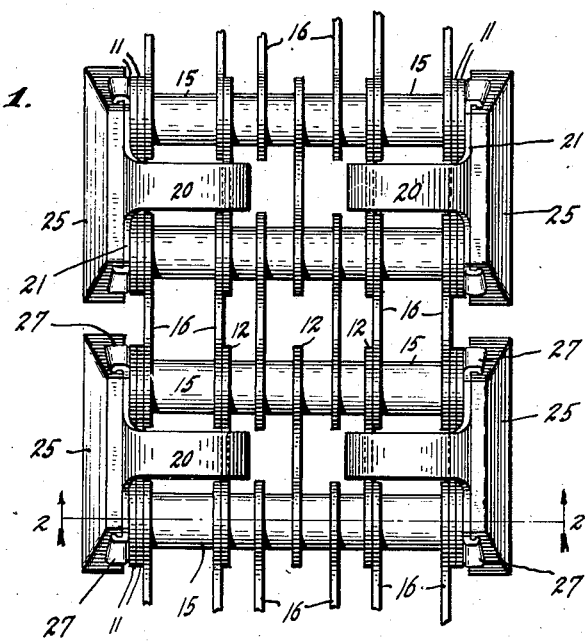
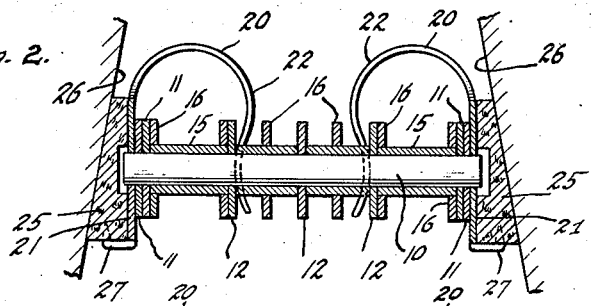
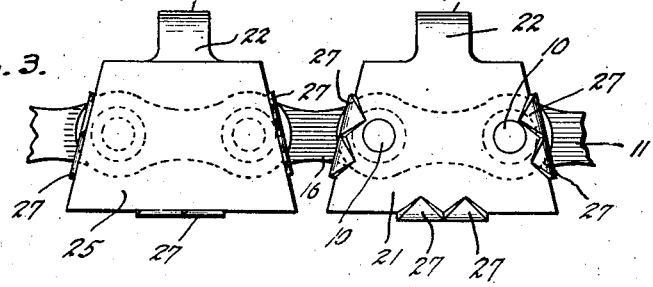
INVENTORS.
GEORGE G. MIZE,
BY
ATTORNEYS.

Patented Jan. 30, 1945

2,368,372

UNITED STATES PATENT OFFICE 2,368,372

CHAIN BELT

George G. Mize, Indianapolis, Ind., assignor to Diamond Chain and Manufacturing Company, Indianapolis, Ind., a corporation of Indiana Application August 8, 1942, Serial No. 454,088

5 Claims. (Cl. 74—236)

This invention relates to a chain-belt adapted for use in the transmission of power to or from a V-grooved pulley or between a pair of such pulleys.

It has heretofore been proposed (Firminger Patent No. 1,476,603) to construct such a chain belt by applying to an articulated chain a series of U-shaped, spring-metal clips each of which straddles the chain and bears at opposite sides thereof a pair of pads of compressible material adapted to engage the opposed faces of a V-grooved pulley. I have found that a chain-belt so constructed is of limited utility, because of breakage of the intermediate portions of the pad-bearing clips. I believe this breakage to be due to fatigue probably resulting from the transmission of forces through the clip from one pulley-face to the other.

It is the object of my invention to produce a chain-belt which can be simply and economically constructed. A further object of my invention is to produce a chain-belt embodying pulley-engaging pads carried by spring-metal clips which will be less subject to breakage than those heretofore used. Another object of my invention is to proudce a pad-bearing clip which can be used without change on chains of different widths.

In carrying out my invention I employ a chain embodying an endless series of pivotally interconnected links. On opposite sides of each of alternate links of such a chain I mount generally U-shaped, spring-metal clips, each of which straddles only a portion of the width of the chain. Each clip has an outer leg overlying the outer face of the associated link and bearing a pulley-engaging pad and an inner leg which engages an intermediate portion of the associated link and resiliently holds the outer leg against the outer face of the link.

The accompanying drawing illustrates my invention: Fig. 1 is a plan view of a portion of a chain in which my invention has been embodied; Fig. 2 is a section on the line 2—2 of Fig. 1 showing the pads carried by the clips in engagement with the opposed faces of a V-grooved pulley; and Fig. 3 is a fragmental side elevation showing two clips associated with one side of the chain, one clip being illustrated as bearing a pad and the other being illustrated with the pad removed.

The chain illustrated in the drawing comprises a series of alternately arranged pin-links and bushing-links. Each of the pin-links comprises a pair of pins 10 extending for the full width of the chain and interconnected by a plurality of plates having a press fit upon such pins. As shown, there are a pair of outer plates 11 spaced inwardly a slight distance from the ends of the associated pins and a plurality of inner plates 12 spaced at intervals along the pins; but the number and arrangement of pin-link plates in each pin-link may vary. Successive pin links of the chain are interconnected by a plurality of bushing links, each of which comprises a pair of bushings 15 rotatable upon the pins of adjacent pin links and interconnected by one or more bushing-link plates 16. To hold the bushing links in position laterally of the chain, and also reduce the magnitude of beam stresses in the pins, the bushings 15 of the bushing links fill the gaps between spaced pin-link plates on each pin. In the particular chain illustrated, each of the outer bushings on each pin 10 carries a pair of plates 16 at its ends, while each of the remaining bushings on the pin carries a single plate 16 located centrally of the bushing.

Associated with each of the pin links are a pair of generally U-shaped, spring-metal clips 20. Each of such clips has a plane body portion 21 adapted to lie against the outer face of the pin-link 11 and an arm 22 which extends from one side of the body portion 21 and which is bent on an arc of approximately 180° in extent and of such a radius that the end portion of the arm 22 will engage resiliently the remote face of an inner pin-link plate 12 at or near the plane containing the axes of the two pins associated with the pin-link. Desirably, the extreme end portion of each of the arms 22 is reversely bent to provide an outwardly convex surface engaging the inner pin-link plate 12 in the manner described.

The body portion of each clip 21 is preferably generally trapezoidal in shape and is provided with a pair of spaced holes receiving the ends of the pins 10 of the associated pin link. To the outer surface of the body portion 21 there is affixed a pad 25 of some suitable compressible material, such as leather, the outer face of which is shaped to engage one of the opposed faces of a V-grooved pulley 26. Conveniently, each of the pads 25 is held in place on its associated clip 20 by providing the body portion 21 of the latter at points along its longer side and end edges with pointed fingers 27 which may be bent inwardly of the body portion and forced into the sides and ends of the pad, as will be clear from the drawing.

In the finished chain-belt, each of the clips, together with its associated pad 25, is held in place at the side of the chain by the resilience of the arm 22, with the projecting ends of the associated pins 10 being received in the holes of the body portion of the clip to transmit driving effort to or from the chain. Because each of the two pads 25 associated with each pin link are held thereon by clips which are independent of each other, there can be no transmission of forces through the relatively thin metal of the clip from one pulley-face to the other. The amount of stress introduced into the resilient arm 22 of each clip as a result of force exerted on the associated pad 25 by the engaging face of the pulley 26 is exceedingly slight, since the inner end of the arm 22 is not anchored in any fixed position or with any fixed orientation relative to the associated chain link. Because the maximum load which can be imposed upon them in service is relatively small, my pad-bearing clips have proven to be very long-lived.

Since each of my clips bears a single pad, the same clips may be used without change in the production of chain-belts of any desired width.

In the drawing, I have shown each wedge-shaped friction pad 25 disposed on the clip-body 21 with its thicker edge remote from the arm 22 so that the arms 22 of the several clips will project from the chain-belt inwardly with respect to grooved pulleys over which the chain-belt runs. This is usually desirable when the chain-belt is used to transmit power between two grooved pulleys, as the possibility of the clips striking against some interfering object is thereby reduced. However, as where there would be insufficient clearance for inwardly projecting clip-arms 22 or where the belt is to be used to transmit power between a grooved pulley and a sprocket, the pads may be reversed on the clip-bodies 21.

I claim as my invention:

1. A chain belt, comprising an endless chain having alternating, pivotally connected inner and outer links, each of said outer links including a pair of pins extending transversely of the chain through adjacent inner links and a pair of outer side plates interconnecting said pins, each of said outer links also having two laterally spaced inner side plates provided at their ends with holes receiving said pins, two generally U-shaped clips of resilient material associated with each of said outer links, each of said clips having an outer end overlying the outer face of one of said outer side plates and being provided with a pair of spaced holes receiving the ends of said pins, the other end of such clip resiliently engaging the remote face of one of said inner side plates, and a pulley-engaging friction pad affixed to the outer end of each clip.

2. A chain belt, comprising an endless chain having alternating, pivotally connected inner and outer links, each of said outer links including a pair of pins extending transversely of the chain through adjacent inner links and a pair of outer side plates interconnecting said pins, two generally U-shaped clips of resilient material associated with each of said outer links, each of said clips having an outer end overlying the outer face of one of said outer side plates and being provided with a pair of spaced holes receiving the ends of said pins, the inner end of such clip being disposed intermediate the width of the chain, said outer links being provided with abutments resiliently engaged respectively by the inner ends of said clips to hold the outer clip-ends against the associated outer side plates, and a pulley-engaging friction pad affixed to the outer end of each clip.

3. A chain belt, comprising an endless chain having alternating, pivotally connected inner and outer links, each of said outer links including a pair of pins extending transversely of the chain through adjacent inner links and a pair of outer side plates interconnecting said pins, a pulley-engaging friction pad overlying the outer face of each of said outer links, and means for retaining each of said pads in position, said means including a resilient member acting between the pad and the associated inner link and engaging the latter at a point intermediate its width.

4. A device for converting into a chain-belt a chain having alternating inner and outer links pivotally interconnected in series by pivot pins, said device comprising a generally U-shaped clip of resilient material, said clip having a broad end and a narrow end, said broad end being adapted to lie against an outer face of an outer link and having two spaced holes for the reception of the ends of the pivot pins associated with such link, the narrow end of said clip being adapted to engage the outer link interiorly between such two pivot pins, and a pulley-engaging friction pad secured to the broad end of said clip.

5. A device for converting into a chain-belt a chain having alternating inner and outer links pivotally interconnected in series by pivot pins, said device comprising a generally U-shaped clip of resilient material, said clip having a broad end and a narrow end, said broad end being adapted to lie against an outer face of an outer link, the narrow end of said clip being adapted to engage the outer link interiorly between the two pivot pins associated with such link, and a pulley-engaging friction pad secured to the broad end of said clip.

GEORGE G. MIZE.